United States Patent
Morrison et al.

(10) Patent No.: US 12,284,748 B2
(45) Date of Patent: Apr. 22, 2025

(54) TARGET ASSEMBLY COMPRISING A FISSION PRODUCT CAPTURING LAYER ON A FISSILE TARGET SUBSTRATE

(71) Applicant: BATTELLE MEMORIAL INSTITUTE, Richland, WA (US)

(72) Inventors: Samuel S. Morrison, Richland, WA (US); Lance R. Hubbard, Richland, WA (US); Nicolas Uhnak, Kennewick, WA (US); Bruce K. McNamara, Kennewick, WA (US); Gabriel B. Hall, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 16/944,759

(22) Filed: Jul. 31, 2020

(65) Prior Publication Data
US 2021/0035699 A1 Feb. 4, 2021

Related U.S. Application Data

(60) Provisional application No. 62/880,746, filed on Jul. 31, 2019.

(51) Int. Cl.
*H05H 6/00* (2006.01)
*G21C 3/42* (2006.01)
(Continued)

(52) U.S. Cl.
CPC .............. *H05H 6/00* (2013.01); *G21C 3/42* (2013.01); *G21G 1/02* (2013.01); *G21C 3/20* (2013.01);
(Continued)

(58) Field of Classification Search
CPC ... H05H 6/00; G21C 3/42; G21C 3/20; G21G 1/02; G21G 1/001; G21G 2001/0047; G21G 2001/0068; G21G 2001/0094
(Continued)

(56) References Cited

U.S. PATENT DOCUMENTS

| 3,088,892 A | * | 5/1963 | Cain | ........................ G21C 3/64 |
| | | | | 376/411 |
| 3,669,832 A | * | 6/1972 | Boettcher | .............. G21C 3/626 |
| | | | | 376/457 |

(Continued)

FOREIGN PATENT DOCUMENTS

| WO | WO 2019/104424 | 6/2019 |
| WO | WO PCT/US2020/044543 | 2/2022 |

OTHER PUBLICATIONS

Li , "Treatment and Disposal of the Radioactive Graphite Waste of High-Temperature Gas-Cooled Reactor Spent Fuel", No. IAEA-TECDOC-1790, 2016. (Year: 2016).*

(Continued)

*Primary Examiner* — Jack W Keith
*Assistant Examiner* — Daniel Wasil
(74) *Attorney, Agent, or Firm* — Wells St. John P.S.

(57) ABSTRACT

Fissile target materials are provided. The fissile target materials can include a target substrate and a capturing layer operably interfacing with at least one surface of the target substrate. Fission fissile target materials are also provided that can include a target substrate comprising at least one fissile atom and a capturing layer operably interfacing with at least one surface of the target substrate. The capturing layer can include at least one fission product.

8 Claims, 21 Drawing Sheets
(14 of 21 Drawing Sheet(s) Filed in Color)

(51) Int. Cl.
  *G21G 1/02* (2006.01)
  *G21C 3/20* (2006.01)
  *G21C 21/02* (2006.01)
  *G21C 23/00* (2006.01)
  *G21G 1/00* (2006.01)

(52) U.S. Cl.
  CPC ............. *G21C 21/02* (2013.01); *G21C 23/00* (2013.01); *G21G 1/001* (2013.01); *G21G 2001/0047* (2013.01); *G21G 2001/0068* (2013.01); *G21G 2001/0094* (2013.01)

(58) Field of Classification Search
  USPC ................................. 376/158, 202, 417, 418
  See application file for complete search history.

(56) References Cited

U.S. PATENT DOCUMENTS

| | | | | |
|---|---|---|---|---|
| 3,753,854 | A * | 8/1973 | Krauth | G21C 3/62 376/411 |
| 3,940,312 | A * | 2/1976 | Van Lierde | G21C 3/62 376/411 |
| 4,022,660 | A * | 5/1977 | Johnson | G21C 3/626 376/411 |
| 4,839,133 | A | 6/1989 | Vandergrift et al. | |
| 6,160,862 | A | 12/2000 | Wiencek et al. | |
| 2009/0129533 | A1 * | 5/2009 | Kuczynski | G21C 3/62 376/411 |
| 2011/0194662 | A1 | 8/2011 | Nolen, Jr. et al. | |
| 2019/0043625 | A1 | 2/2019 | Hackett et al. | |

OTHER PUBLICATIONS

Killeen, "Experimental Data on PCI and PCMI within the IFPE Database", In Proceedings of Seminar on Pellet-clad Interaction in Water Reactor Fuels, OECD-NEA, Cadarache, France, Mar. 2004, p. 1-18. (Year: 2004).*

Paramonov, "PCI Risk Assessment Model", In International Conference on Nuclear Engineering, vol. 49330, pp. 585-591. 2010. (Year: 2010).*

WO PCT/US2020/044543 Search Rept., Dec. 31, 2020, Battelle Memorial Institute.

WO PCT/US2020/044543 Writ. Opin., Dec. 31, 2020, Battelle Memorial Institute.

Adelstein et a., "Molybdenum-99 for Medical Imaging", Committee on State of Molybdenum-99 Production and Utilization and Progress Toward Eliminating use of Highly Enriched Uranium; Nat. Academies of Sci., Eng. & Med., 2016, National Academies Press, Washington DC, 264 pages.

Smaga et al. "Electroplating Fission-Recoil Barriers onto LEU-Metal Foils for 99Mo-Production Targets", International Meeting on Reduced Enrichment for Research and Test Reactors, Oct. 1997, United States, 16 pages.

SRIM (Stopping and Range of Ions in Matter), "Download SRIM Software," Accessed Mar. 22, 2018, at http://www.srim.org/SRIM/SRIMLEGL.htm, 2 pages.

Katalenich, "Production of Cerium Dioxide Microspheres by an Internal Gelation Sol-Gel Method", Journal of Sol-Gel Science and Technology 82(3), 2017, United States, pp. 654-663.

Larijani et al., "Progress on the Chemical Separation of Fission Fragments from 236 Np Produced by Proton Irradiation of Natural Uranium Target", Radiation Physics and Chemistry 140, 2017, United Kingdom, pp. 480-486.

O'Hara et al., "Nanoparticles and Thin Films for the Rapid Extraction and Assay of Alpha-Emitting Radionuclides and Radioiodine from Urine: Demonstration of a Novel Radiobioassay Method", Health Physics vol. 101, No. 2, Aug. 2011, United States, 13 pages.

Wilbraham et al., "The Effect of Hydrogen Peroxide on Uranium Oxide Films on 316L Stainless Steel", Journal of Nuclear Materials vol. 464, 2015, Netherlands, pp. 86-96.

Wu et al., "Synthesis of Colloidal Uranium-Dioxide Nanocrystals", Journal of the American Chemical Society vol. 128, No. 51, 2006, United States, pp. 16522-16523.

* cited by examiner

TARGET ASSEMBLY COMPRISING A FISSION PRODUCT CAPTURING LAYER ON A FISSILE TARGET SUBSTRATE

CROSS REFERENCE TO RELATED APPLICATION

This application claims priority to and the benefit of U.S. Provisional Patent Application Ser. No. 62/880,746 filed Jul. 31, 2019, entitled "Advanced Targets for Isotope Production", the entirety of which is incorporated by reference herein.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

TECHNICAL FIELD

The present disclosure relates to target materials in nuclear reactors and more particularly to fissile target materials and methods for processing fissile target materials.

BACKGROUND

The production of fission and activation products from fissile target irradiation presents a variety of challenges for follow on use of individual fission products or activation products. In order to use either a fission product or an activation product, a chemical separation must be performed to isolate the product of interest. Isolation of the desirable product, individual fission product or activation product, requires a large-scale separation from the bulk unconsumed fissile target material, separation from fission products, or activation products of non-interest. These chemical separations are costly, time consuming, and often involve high dose samples (and engineered shielding to enable handling of these samples). To address these concerns a variety of technologies and techniques have been invented and deployed. However, each of these prior art embodiments and techniques present various problems and alternatives. The present invention provides a significant advance over these items.

SUMMARY

Methods for preparing fissile target materials are provided. The methods can include preparing a target substrate that includes a fissile atom, and layering at least one surface of the substrate with a capturing layer.

Fissile target materials are provided. The fissile target materials can include a target substrate and a capturing layer operably interfacing with at least one surface of the target substrate.

Methods for fissioning fissile target materials are also provided. The methods can include irradiating fissile target material to capture fission products of the irradiated fissile target material in a capturing layer of the target material.

Fission fissile target materials are also provided that can include a target substrate comprising at least one fissile atom and a capturing layer operably interfacing with at least one surface of the target substrate. The capturing layer can include at least one fission product.

Methods for separating fissioned product from fission fissile target materials are also provided. The methods can include separating at least a portion of the captured layer of the fissioned fissile target material from the fissile target material.

Methods for processing fissioned fissile target materials are also provided. The methods can include separating a capture layer from the fissioned fissile target material to remove at least some of the fissioned product atoms. The methods can further include purifying fissile atoms for recycling and/or isolating activation product.

DRAWINGS

The patent or application file contains at least one drawing executed in color. Copies of this patent or patent application publication with color drawing(s) will be provided by the Office upon request and payment of the necessary fee.

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
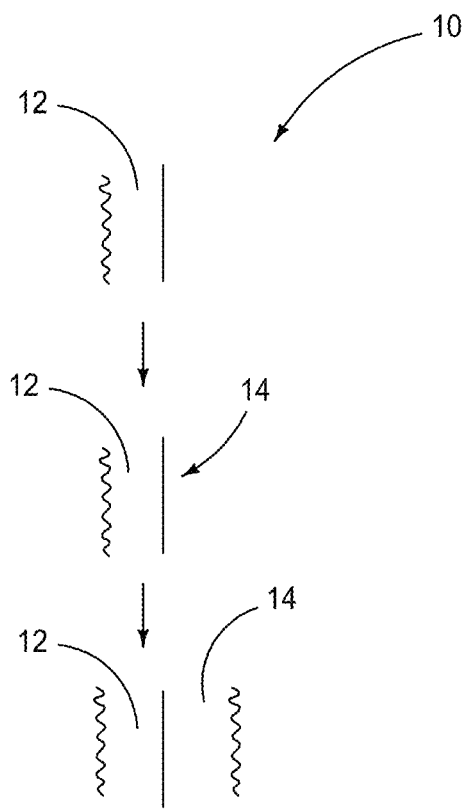
FIG. 1 is a depiction of a method for preparing fissile target material according to embodiments of the disclosure.

The methods and materials of the present disclosure will be described with reference to FIGS. 1-23. Referring first to FIG. 1, a method 10 is depicted for preparing a fissile target material for nuclear irradiation. This target material 12 can include a fissile target such as a fissile atom. At least one component of the target material is a target substrate. This target substrate can be configured planarly or spherically.

In accordance with example implementations, target material 12 can have a surface, and upon that surface can be applied a capturing layer 14. Capturing layer 14 can be a metal or organic material. When configured planarly, the capturing layer can be provided along a flat surface of the planar substrate. When configured spherically, the capturing layer can be provided along a curved surface of the sphere. In accordance with example implementations, the capturing layer can be provided about the entirety of the exterior surface of the target substrate. Example implementations can include providing an intermediate layer between the capturing layer and the target substrate and/or providing separable capturing layers, and/or multiple capturing layers of different compositions. Capturing layers can be applied via deposition, coating, veneering, and/or laminating, for example.

Figure 2A:
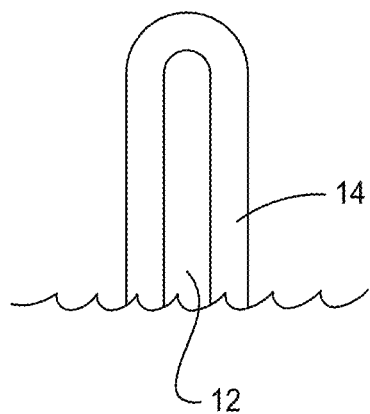
FIGS. 2A and 2B are examples of fissile target material according to embodiments of the disclosure.
Figure 2B:
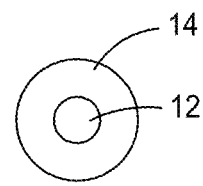

Referring next to FIGS. 2A and 2B, example configurations of the target materials of the present disclosure are provided. In one example, the target material can have substantially planar formations where fissile target material 12 has a capturing layer 14 to form the fissile target material. As can be seen, there are planar portions of this fissile target material and the capturing layer can be applied to flat portions thereof. Accordingly, material 12 can also be configured as a cylinder or rod having a planar portion in one cross section and a spherical portion in another cross section.

In accordance with example implementations, the fissile target material can be spherical such as a micro capsule like that shown in FIG. 2B, wherein the fissile target material 12 is coated with a capturing layer 14.

Example target substrates can include Th, U, Np, and/or Pu ($^{232}$Th, $^{233}$U, $^{235}$U, $^{238}$U, $^{237}$Np, $^{238}$Pu, $^{239}$Pu, and/or $^{240}$Pu). The target substrates can have a thickness it at least one cross section and this thickness can be from about 2 μm to about 5 μm, making the targets microscale targets.

Example capturing layer materials can include metals such as vanadium, nickel, graphite, ceramics, and/or polymers such as polyethylene glycol (PEG) and other polymers composed at least partially or entirely out of carbon and oxygen. This capturing layer can have an overall thickness in at least on cross section of from about 9 μm to about 35 μm. In accordance with example implementations, multiple and/or separable capturing layers can be provided upon the target substrates and these layers may be of the same or different materials.

Target material 12 can be considered a microscale recoil suppression coated fissile target material that can be polymer coated as the thickness of the material in at least one cross section can be from about 12 μm to about 40 μm.

Figure 3:
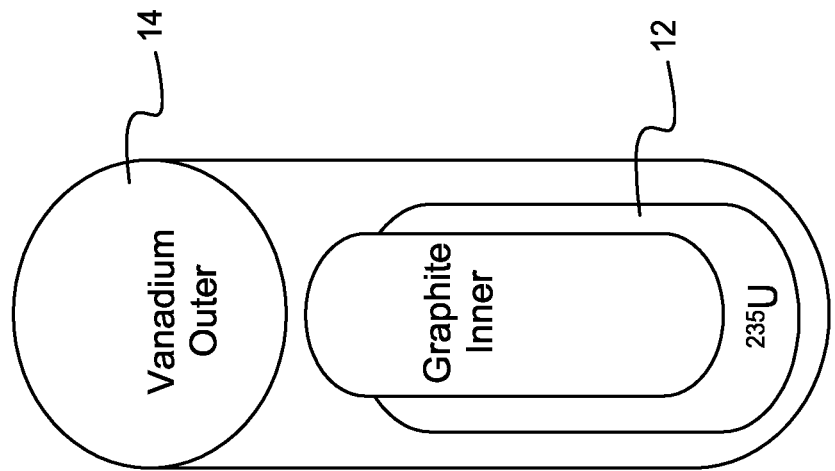
FIG. 3 is another example of fissile target material according to an embodiment of the disclosure.

Referring next to FIG. 3, a more detailed depiction shows a graphite inner, and about the graphite inner can be a fissile target material 12, and about fissile target material 12 can be capturing layer 14. This example fissile target material is irradiated and data collected as shown in Table 1 below.

Figure 4:
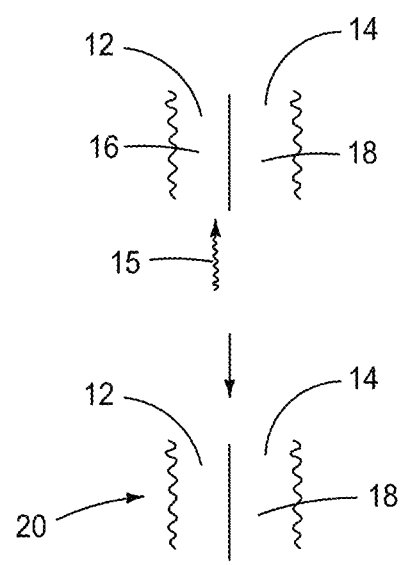
FIG. 4 is a depiction of a method of fissioning fissile target material according to an embodiment of the disclosure.

Referring next to FIG. 4, an example method for irradiating the fissile target material of the present disclosure is depicted wherein nuclear irradiation 15 is provided to at least target material 12 to create a fission product 16. Fission product 16 travels into capturing layer 14 where it is captured or contained within capturing layer 14. In accordance with example implementations, this can prepare a fissile target intermediate 20 that can include fissile target material 12 having a capturing layer operatively engaged therewith, and that capturing layer can include a fission product 18. The irradiation can be proton or neutron. The irradiation energy can be from about 0.025 eV to about 50 MeV and can create an activation product which can be retained within the target material but outside the capturing layer.

Fission products can be created and these fission products can enter the capturing layer. The fission products can be separated by at least about 2 μm in capturing layer. The capturing layer can include multiple layers such as at least two or more layers that are separable from one another. In accordance with example implementations one fission product can be captured within at least one of the capturing layers and another fission product can be captured within another of the capturing layers.

Figure 5:
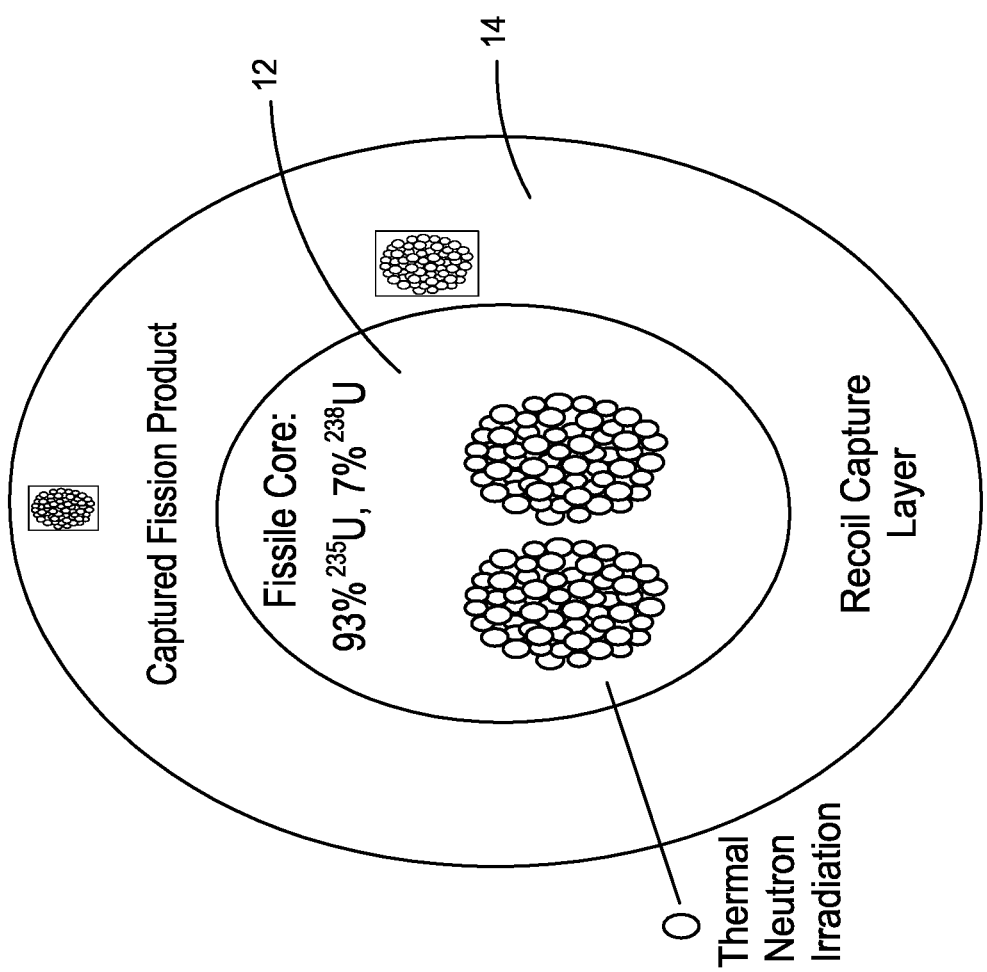
FIG. 5 is a depiction of a fissioned fissile target material according to an embodiment of the disclosure.

Referring next to FIG. 5, an example intermediate fissile material is depicted. This example intermediate can include captured fission product within capturing layer 14 which is about fissile target material 12 that includes a fissile core and the depicted components thereof. In accordance with example implementations, the capturing layer operably engages the target substrate in that upon fissioning, fission products can leave the substrate and enter the capturing layer. In accordance with example implementations, fissile product can migrate as they exit $UO_2$ core into the capturing layer.

In accordance with example implementations, the fissioned fissile target materials can include activation products within the target substrate. These activation products can be one or more of $^{233}$U, $^{237}$Np, $^{238}$Pu, $^{244}$Pu, $^{241}$Am, $^{243}$Am, $^{248}$Cm, $^{249}$Bk, $^{249}$Cf, and/or $^{252}$Bk. The fission products within the capturing layer can be one or more of $^{131}$I, $^{133}$Xe, $^{131}$Cs, $^{133}$Cs, $^{134}$Cs, $^{89}$Sr, $^{90}$Y, $^{153}$Sm, $^{90}$Sr, $^{140}$Ba, $^{95}$Zr, $^{95}$Nb, $^{140}$La, $^{144}$Ce, $^{144}$Pr, $^{141}$Ce, $^{147}$Pm, $^{105}$Rh, $^{151}$Sm, $^{106}$Rh, or $^{106}$Ru. At least two of these fissioned products may reside in different portions of the capturing layer, and these different portions may be separable from one another and/or of different compositions.

Figure 6:
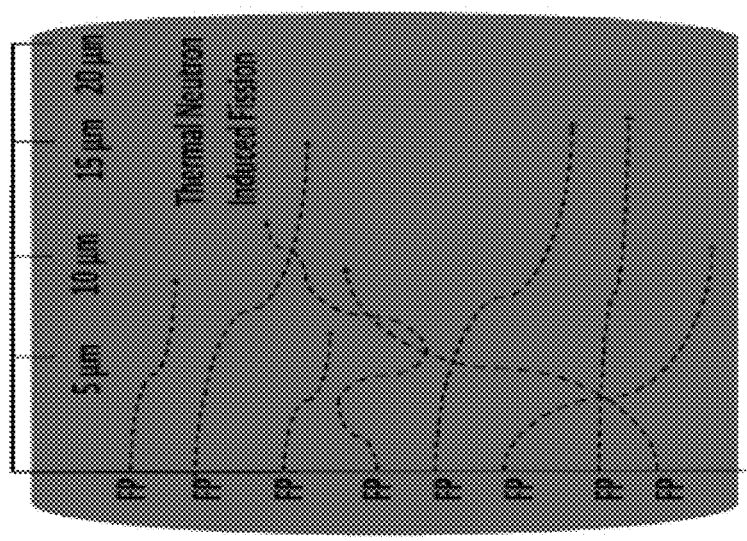
FIG. 6 is a graphical depiction of the transmission of fissioned products according to an embodiment of the disclosure.

Referring next to FIG. 6, examples of pathways and distance of fission products are shown in FIG. 6. These examples can be acquired by placing depleted uranium layers on top of HEU foil with increasingly thick layers.

These foils can be irradiated with the HEU layer closest to an external thermal neutron port at a 1 MW TRIGA reactor. Gas proportional counters can be used to measure individual fission products as they permeate the varying thicknesses of depleted uranium. Accordingly, fission product transmission stopping and range ion can be determined.

Figure 7:
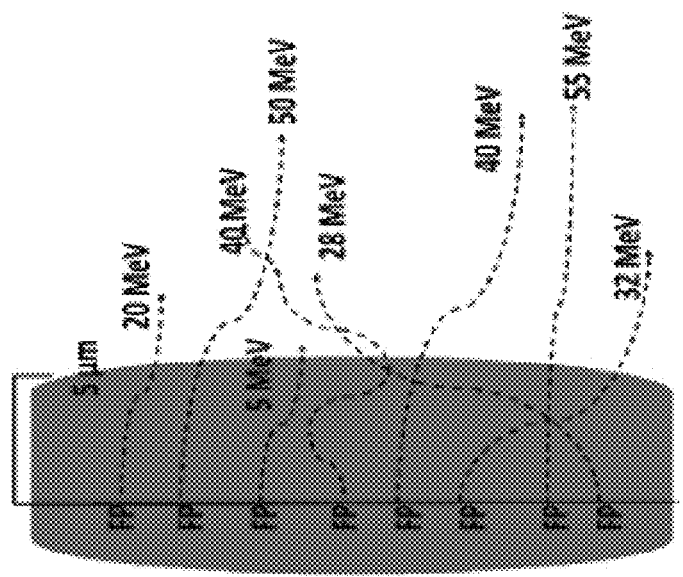
FIG. 7 is a graphical depiction of the transmission of fissioned products according to an embodiment of the disclosure.

FIG. 7 depicts fission product tracks that can be determined when assessing when assessing the kinetic energy of fission products as they are ejected from the HEU and as they transmit through the depleted uranium layer. The fission product loss of energy can be determined as a function of distance traveled through the uranium. The loss of energy can provide a better understanding of the penetration of fission products when transitioning to a multi-layer system.

Figure 8:
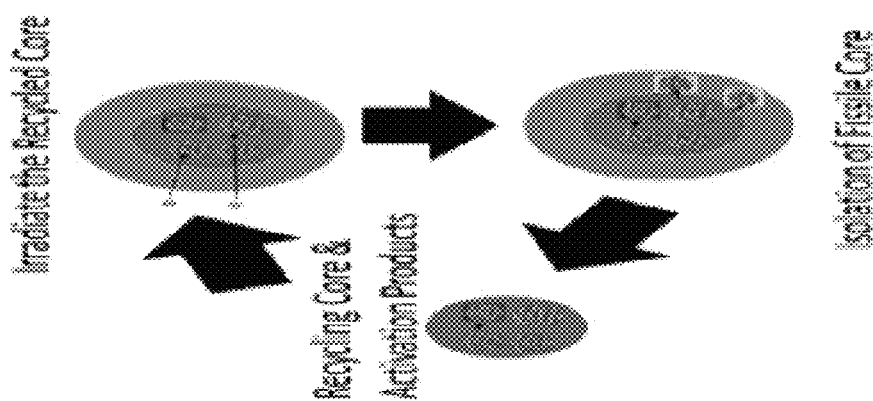
FIG. 8 is a depiction of a method of fissioning fissile target material according to an embodiment of the disclosure.

Referring next to FIG. 8, as an example, the irradiated recycled core can have its fissile core recycled and reused and recoated as shown in FIG. 8. During production of the activation product, very little kinetic energy is produced and therefore the activation products stay within the target material. Accordingly, activation product can be isolated from the target material—a potentially simple process, compared to fission product separation from activation products. The activation products and the target material may also be further irradiated if solely fission product production is desired.

In accordance with example implementations, irradiated fissile cores can be recycled for thermal neutron irradiations, 14 MeV neutron irradiations, and accelerator irradiations. To recycle the target materials the capture layer can be removed, isolating the fissile core. The fissile core can be recoated with a fresh recoil capture layer and the irradiation repeated.

Figure 9:
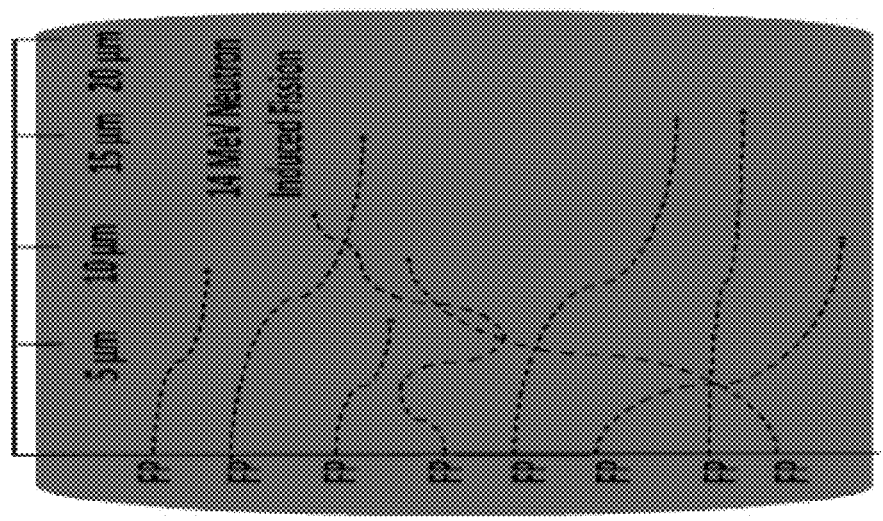
FIG. 9 is depiction of fission product pathways according to an embodiment of the disclosure.

Referring to FIG. 9, the tracking of fission products is shown from $UO_2$ for 14-MeV-Neutron Induced Fission. Behavior of the intermediate fission products ranging from mass 90 to mass 115, which are typically relatively lower in yield can be assessed. Fast fission can yield more of these products, and their greater presence can provide for effective examination of their behavior. Accordingly, the difference in fission product behavior for the high-yield fission products as a function of the neutron energy that induced the fission can be determined.

Figure 10:
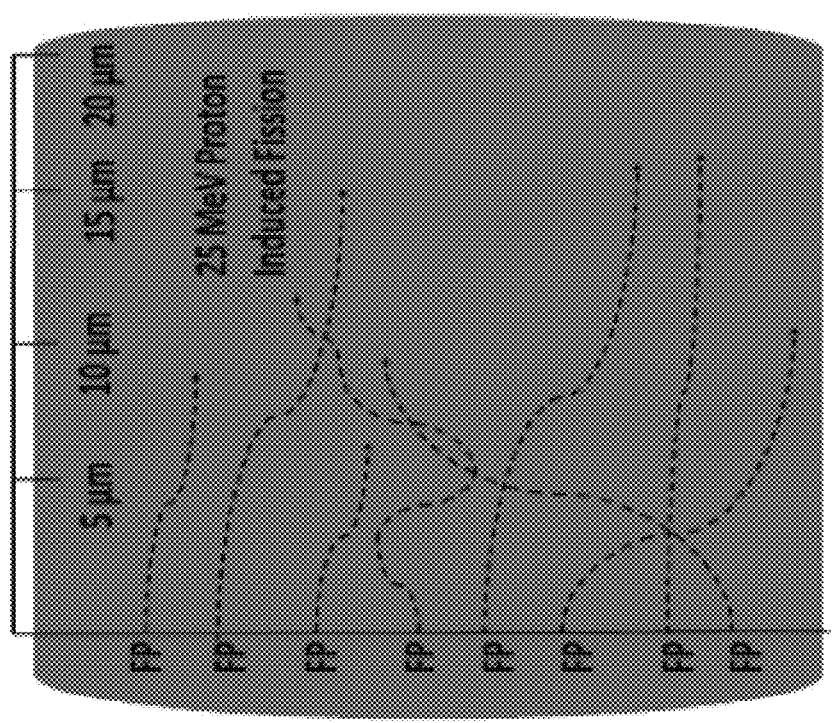
FIG. 10 is a depiction of fission product pathways according to an embodiment of the disclosure.

Referring next to FIG. 10, the tracking of fission products is shown from $UO_2$ for 25-MeV-Proton Induced Fission. Fission induced by accelerators such as these may demonstrate unique behavior and a possible directional bias, based on the beams onset. Accordingly, the fission products penetration depth may increase farther away from the target and decrease closer to the target. The accelerator-induced fission product capture can impose additional heat onto the target material. In accordance with example implementations, the capturing material may be selected to account for this additional heat. Therefore, rather than polymer-based systems, materials that have higher thermal resistance properties may be selected. At least one example material can be ceramic cladding. Additionally, a target material can include a system of a thin graphene layer around the target material, which can render the target inert during layer removal.

Referring next to FIGS. 11-14, depth data of fission products within the capturing layer have been determined, and these depth and trajectories are depicted in graphical form in FIGS. 11-14. In accordance with example implementations, the Stopping and Range of Ions in Matter (SRIM) model can be used to determine depth and trajectories.

A shallow dive exploration of fission product ejection from uranium metal and uranium oxide can be performed using SRIM model for uranium and recoil capture materials. The input parameters for this modeling can be the density and composition of the target material or recoil capture material. For the mass and element of the ion (fission product) and the initial kinetic energy for the ion (fission product) Equation 1 below can be used, for conservation of energy in A-symmetric fission and 165 MeV as the kinetic energy split between the fission products. The greatest and least recoil ejections of one of the smallest fission products 72 Ga (~115 MeV) and one of the largest fission products 161 Tb (~50 MeV) can be determined.

$$E_1 = \left(\frac{A_2}{A_1 + A_2}\right) E_{kinetic} \qquad \text{Eq. 1}$$

Where $E_1$ is the kinetic energy for the fission product of mass $A_1$, $A_2$ is the mass of the other fission product, and $E_{kinetic}$ is the total fission product energy imparted into each fission product.

Figure 11:
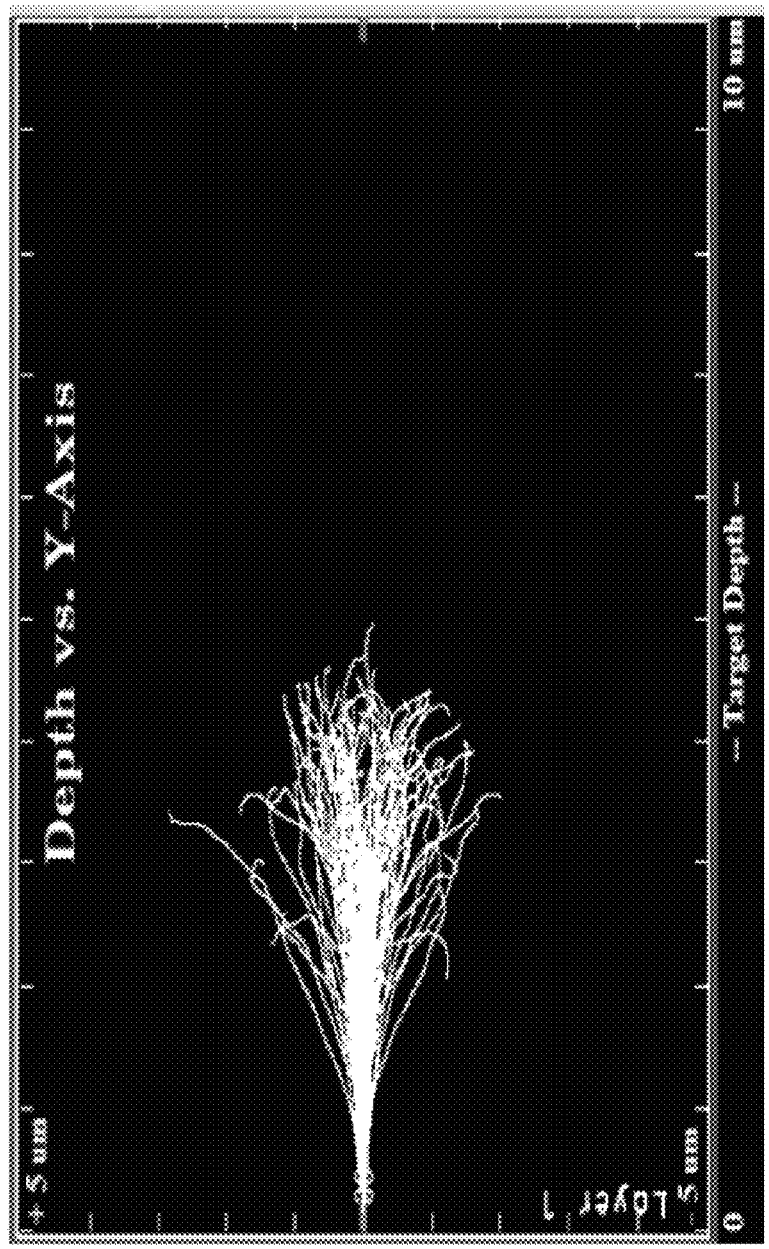
FIG. 11 is a graphical depiction of data reflecting the depth of fissioned products according to an embodiment of the disclosure.

The stopping range of fission products can be determined for uranium metal, uranium oxide, and for an outer recoil capture layer. FIGS. 11-14 demonstrate data acquired. FIG. 11, for example, is the transmission distance for the least penetrating fission product $^{161}$Tb. The $^{161}$Tb penetration through natural uranium metal was determined to be 3.8±0.6 µm.

Figure 12:
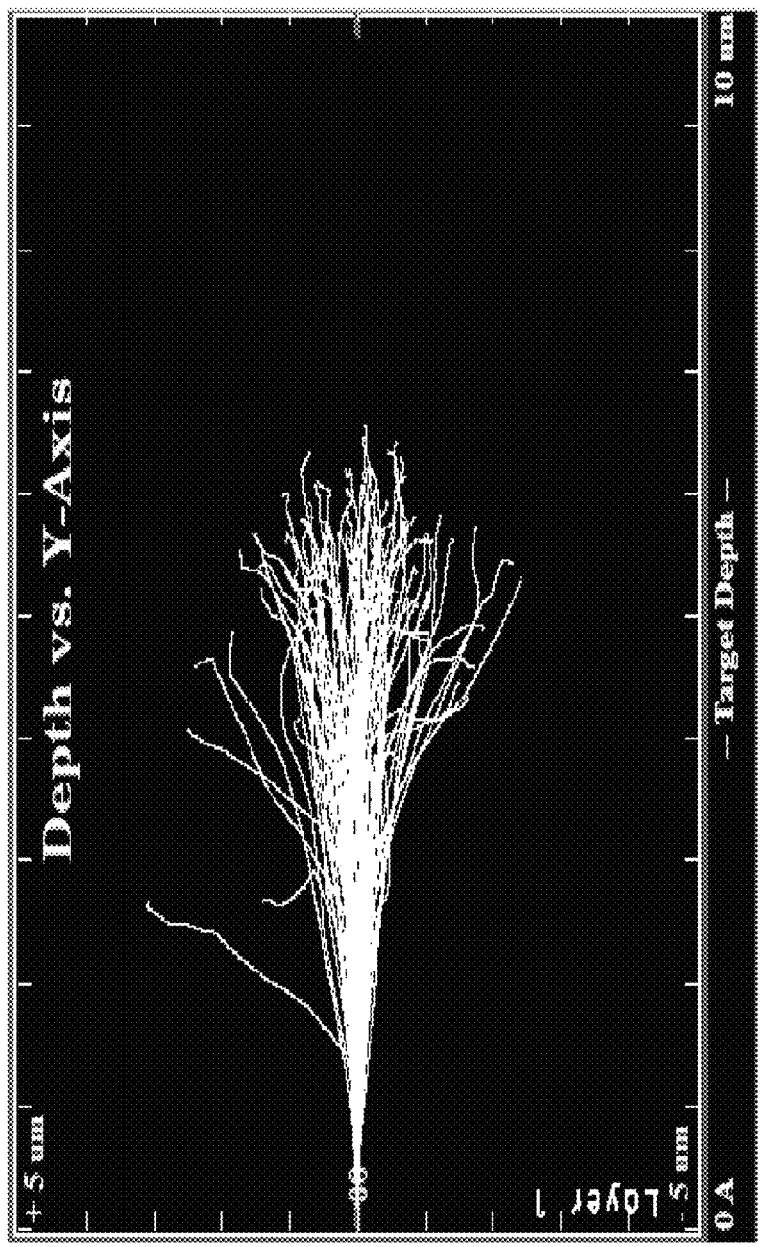
FIG. 12 is another depiction of data depicting the depth of fissioned products according to an embodiment of the disclosure.

Referring to FIG. 12, the fission product $^{161}$Tb transmission through $UO_2$ density of 10.97 g/cm$^3$. The $^{161}$Tb ion would penetrate 5.3±0.7 µm.

Figure 13:
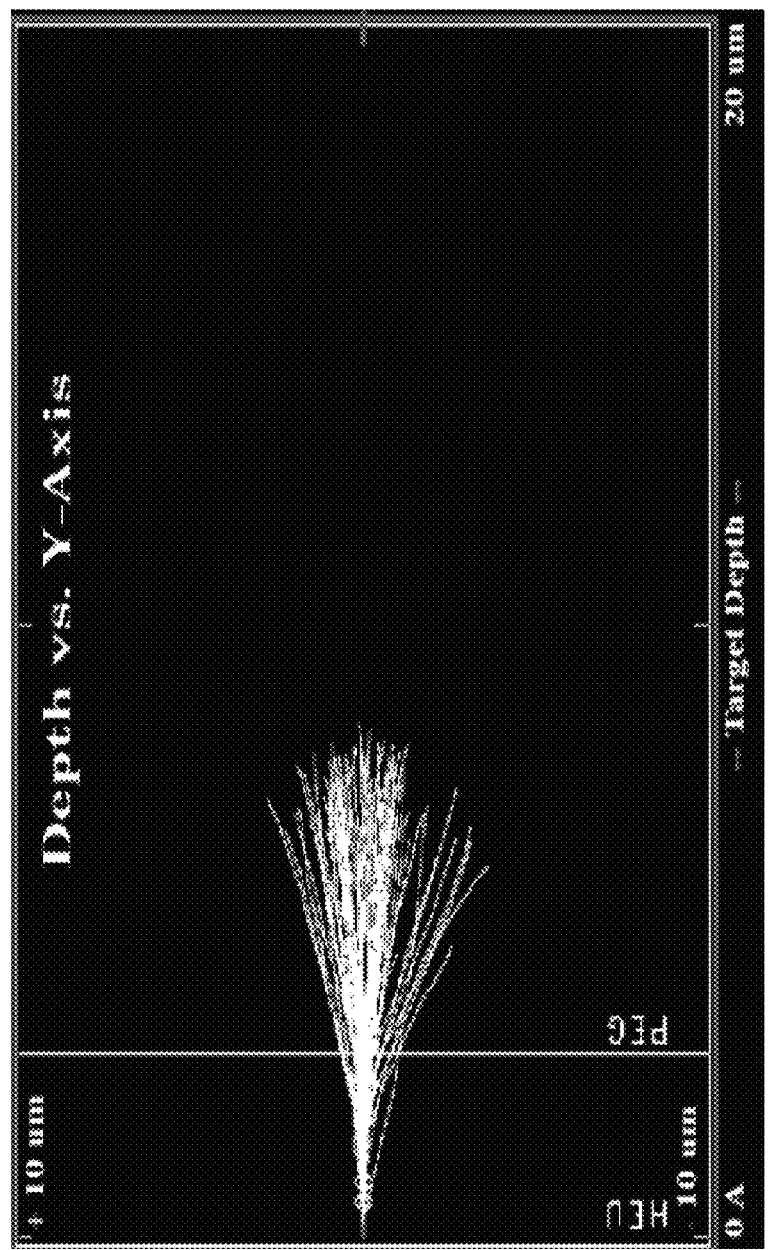
FIG. 13 is a depiction of data reflecting the depth of fissioned products according to an embodiment of the disclosure.
Figure 14:
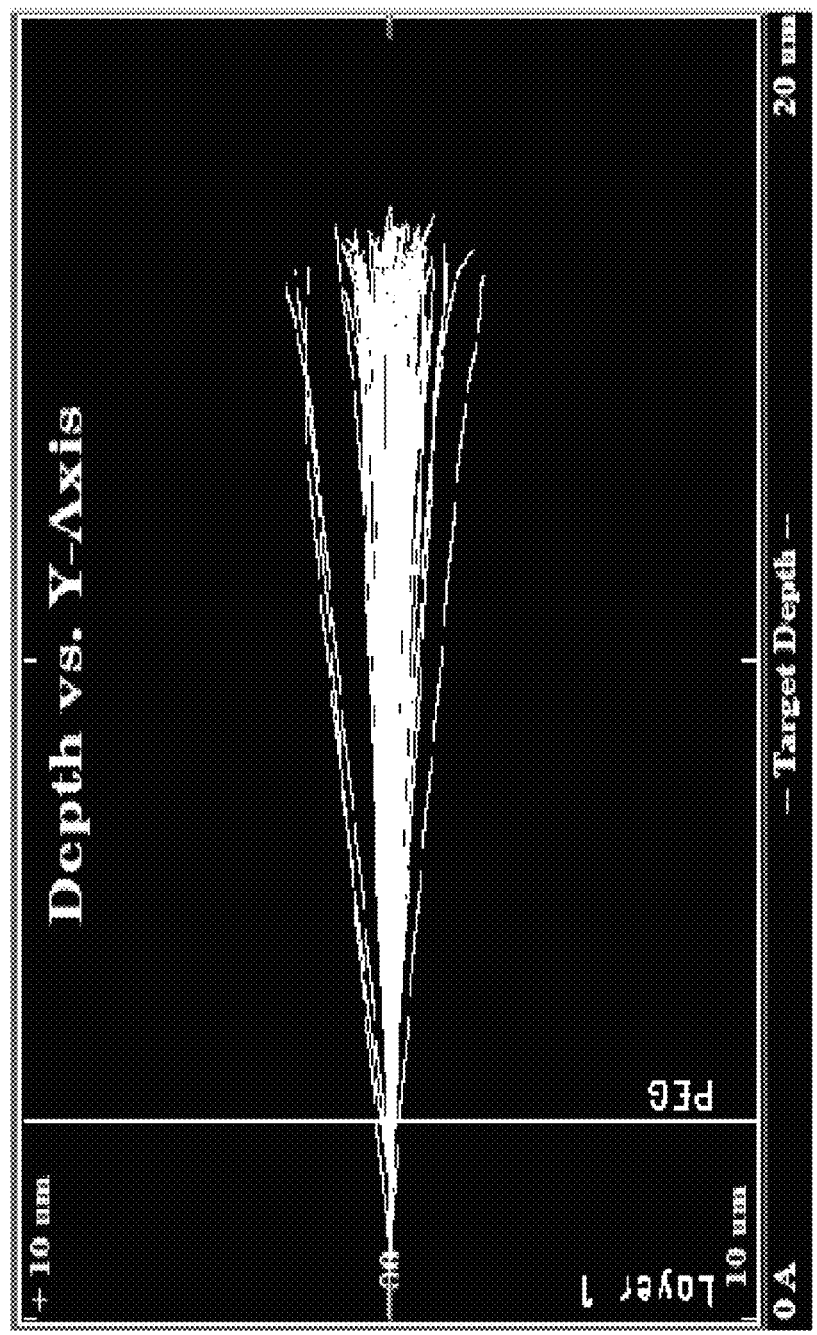
FIG. 14 is another depiction of the depth of fissioned products according to an embodiment of the disclosure.

Fission product recoil capture into a polyethylene glycol capture layer can be determined for the $^{161}$Tb fission product transmission through 3 µm of uranium oxide into polyethylene glycol and displayed in FIG. 13. Accordingly, the fission product may eject from the uranium and remain captured in the polyethylene glycol.

Additionally, transmission of $^{72}$Ga, the fission product with the longest recoil ejection can be determined. The penetration of $^{72}$Ga through 3 µm into an additional 17 µm of polyethylene glycol capture layer are displayed in FIG. 14. As shown, the $^{72}$Ga fission product would recoil 16.2±0.3 µm. In accordance with example implementations, the fission products can be captured from a 3 µm layer of uranium into a 17 µm recoil capture layer composed of polyethylene glycol.

Referring again to the target material of FIG. 3, for example, attempted construction of a planar polymer coated fissile target. 93% enriched Uranium can be deposited onto a 50-µm graphite rod. The graphite rod can then be coated with 50 µm of polyethylene glycol and then sealed with high purity quartz to comply with irradiation requirements. The sealing with quartz can generate heat that may transfer from the quartz to the polymer which may cause decomposition of the polymer layer. The target material can be adapted to use a metal capture layer such as vanadium.

Accordingly, two separate assemblies were constructed, each beginning with electrodeposition of 93% enriched uranium onto a 50-µm thick graphite rods. The mass of uranium deposited onto the graphite rod was roughly 10 µg for each rod and equated to a thickness of less than 1 µg onto the graphite rods. Vanadium metal was chosen for the outer recoil capture layer because of its thermal resistivity and neutron transparency. The vanadium recoil capture layer was 100 µm thick. This target assembly is shown in FIG. 3. The assembly, was a 50 µm graphite rod that had 1 µm thick containing nominally 10 µg of 93% enriched uranium electrodeposited onto it. The recoil capture layer was a 100-µm thick vanadium metal layer.

The assemblies were irradiated over a course of 1.78 hours, producing roughly $10^{10}$ fissions, and then allowed to cool for 16 hours before gamma screening and disassembly. High-purity germanium detectors were used to perform gamma spectroscopy on the complete assembly and each individual portion of the assembly.

The results of the gamma analysis are displayed in Table 1. The vanadium recoil capture layers were manually removed from the assembly, prior to fission product quantification. The uranium target layer was removed from the graphite by agitation mixing with 10 mL of concentrated hydrochloric acid. The graphite recoil capture layers were analyzed after the uranium target material was removed.

TABLE 1

Activity of key fission products and activation products detected in each portion of the two irradiated assemblies. Fission products were detected in the recoil capture layers and the activation product 239Np was detected in the target material.

| Components | $^{131}$I (Bq) | $^{133}$Xe (Bq) | $^{239}$Np (Bq) |
|---|---|---|---|
| Complete Assembly #1 | $4.12 \pm 0.08 \times 10^4$ | $1.1 \pm 0.1 \times 10^5$ | D.L. <1000 |
| V Recoil Capture Layer #1 | $2.46 \pm 0.08 \times 10^4$ | $6.1 \pm 0.2 \times 10^4$ | D.L. <600 |
| U Target Layer #1 | $120 \pm 20$ | D.L. <150 | $63 \pm 7$ |
| Graphite Rod #1 | $2.33 \pm 0.04 \times 10^4$ | $5.2 \pm 0.1 \times 10^4$ | D.L. <500 |
| Complete Assembly #2 | $4.75 \pm 0.09 \times 10^4$ | $1.7 \pm 0.1 \times 10^5$ | D.L. <1200 |
| V Recoil Capture Layer #2 | $2.30 \pm 0.03 \times 10^4$ | $5.9 \pm 0.2 \times 10^4$ | D.L. <400 |
| U Target Layer #2 | $40 \pm 10$ | D.L. <100 | $84 \pm 7$ |
| Graphite Rod #2 | $2.60 \pm 0.03 \times 10^4$ | $6.0 \pm 0.1 \times 10^4$ | D.L. <500 |

D.L. = analyte was below the achievable detection limit for the instrument

Quantification of the activation product, $^{239}$Np, in the recoil capture layer was not possible because the quantity of $^{239}$Np produced during irradiation was below the gamma analysis detection limit. For the uranium target layer, the $^{239}$Np activation product was detected in the target layer during irradiation and after disassembly of the target material.

In accordance with another example, the target material can be a 3 layered target with the inner layer Ni, the middle layer $^{235}$U, and an outer V capsule. After irradiation, fission products in Ni layer and the V capsule could be quantified with no detectable $^{235}$U present. The fission product and $^{235}$U for target type is shown below in Table 2.

TABLE 2

Inner layer Ni, the middle layer $^{235}$U, and an outer V capsule

| Design (inner/middle/outer) | Inner % FP % $^{235}$U | Middle % FP % $^{235}$U | Outer % FP % $^{235}$U |
|---|---|---|---|
| Nickel-$^{235}$U-Vanadium (n = 6, ±1σ) | 52 ± 8% FP >0.01% $^{235}$U | 2 ± 2% FP 98 ± 3% $^{235}$U | 49 ± 7% FP >0.01% $^{235}$U |
| Graphite-$^{235}$U-Vanadium (n = 3, ±1σ) | 40 ± 7% FP, >0.01% $^{235}$U | 23 ± 8% FP 97 ± 2% $^{235}$U | 35 ± 8%FP >0.01% $^{235}$U |

Figure 15:
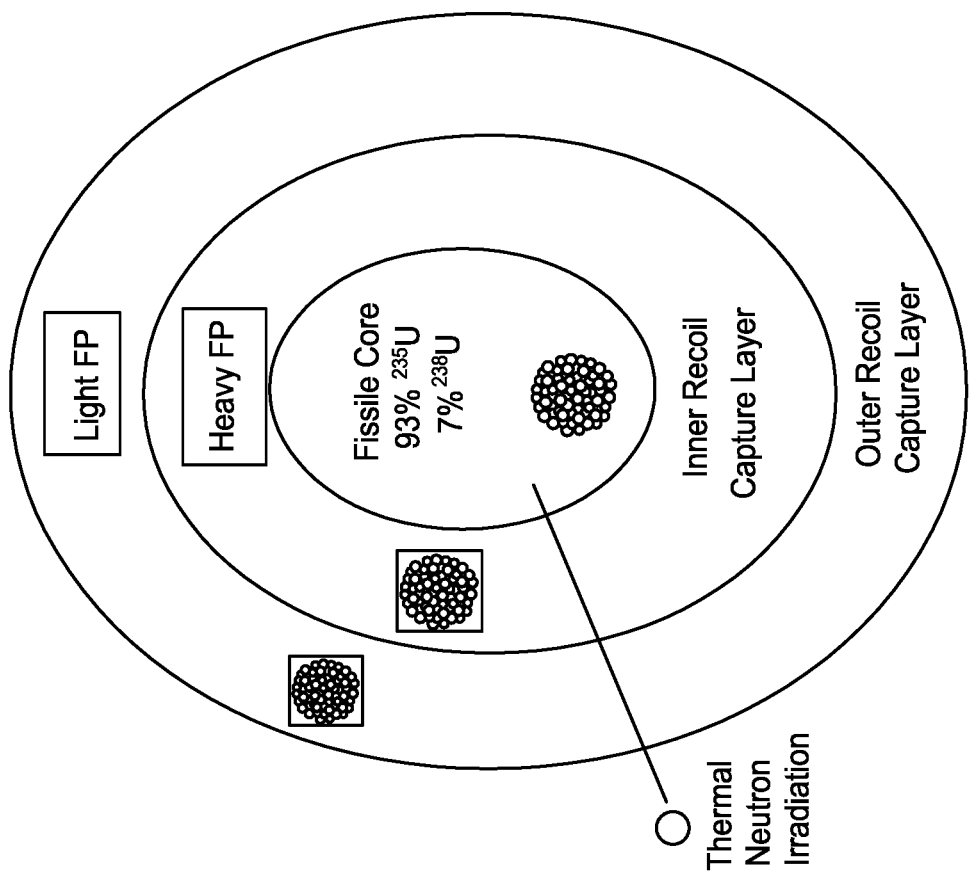
FIG. 15 is a depiction of a fissioned fissile target material according to an embodiment of the disclosure.
Figure 16:
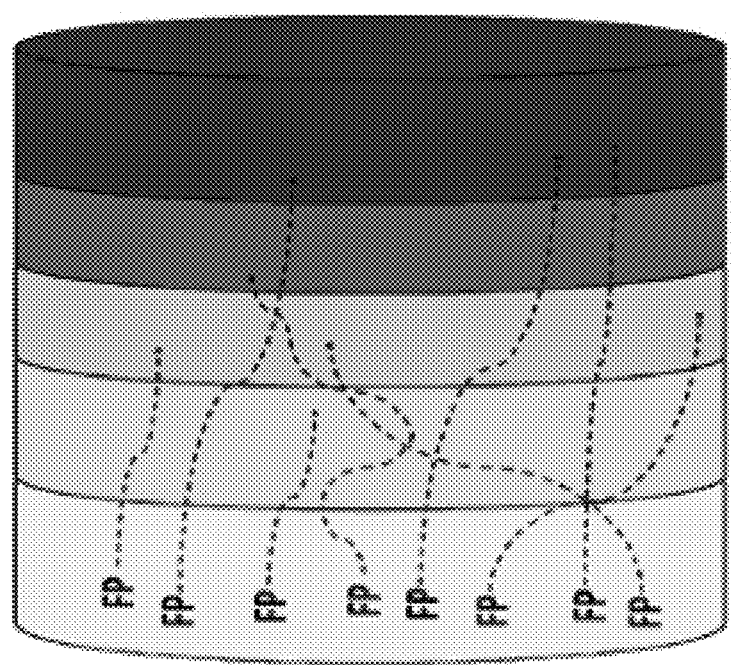
FIG. 16 is a depiction of fissioned product transmission pathways according to an embodiment of the disclosure.

Referring next to FIG. 15, it is contemplated that the target materials can have more than one layer, or even one layer; however, different fission products may exit or travel to different depths within the capture layer, and the capture layer can be segmented accordingly to further isolate fission products between the depths that they travel within the capture layer. As shown in FIG. 15, an intermediate can have certain depths of capture layers, or at least two different capture layers that can be separated from one another or removed in sections to isolate different fission products. The distribution of kinetic energy into the fission products during fission is inversely correlated to the mass of the fission product. The smaller fission products are able to migrate further following fission product ejection. The difference in migration distances is an opportunity to separate fission products in different layers. The different layers may be of the same material but separable from one another after irradiation as part of the fissioned target material processing. In accordance with other implementations, the materials of the different layers may be of different compositions. Precise layering of polymer layers of unique composition will allow for selective removal of each layer. As shown in FIG. 16, fission products can provide fission tracks through one or more different layers for example.

Figure 17:
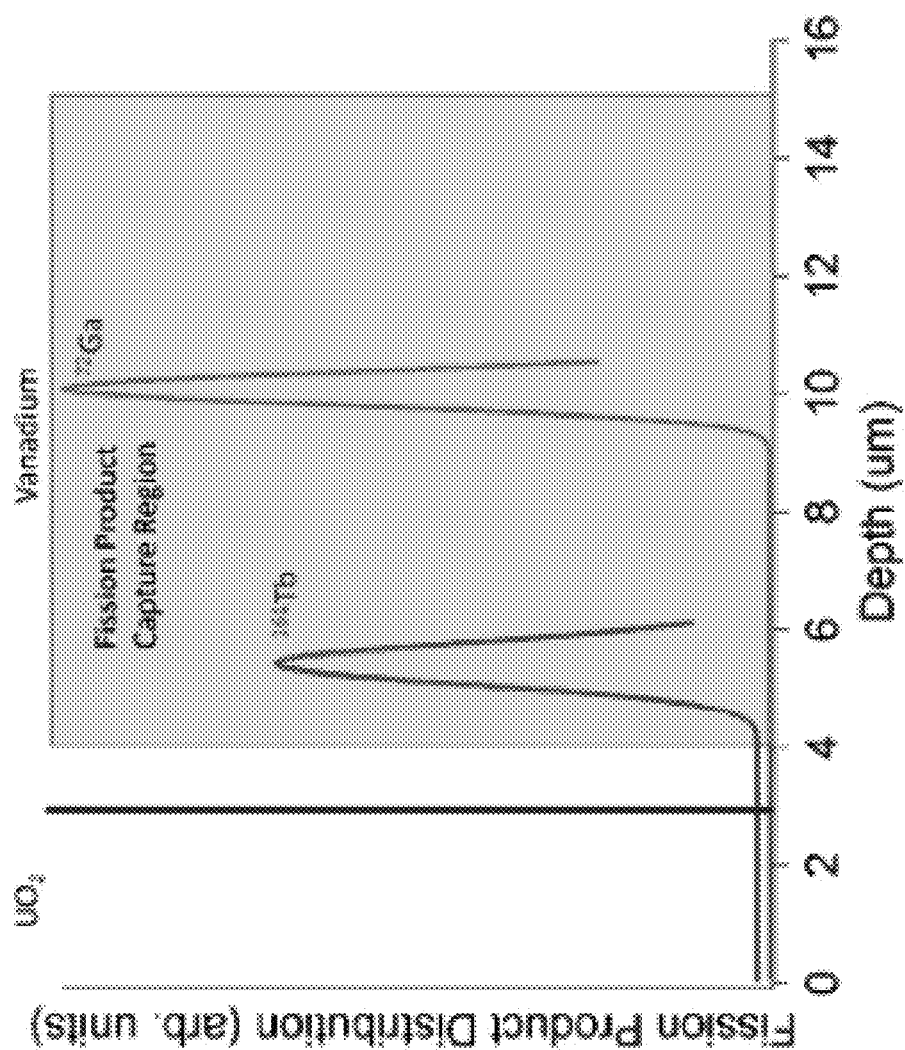
FIG. 17 is graphical data representing the depth of two different fissioned products according to an embodiment of the disclosure.

As depicted in FIG. 17, data indicates that fission products such as Tb and Ga can migrate to depths as different as 2 µm, and these depths can be utilized to separate these two different fission products. The stopping range of fission products was measured for uranium metal, uranium oxide, and for an outer recoil capture layer. FIG. 17 shows example results of ion penetration depth. FIG. 17 shows the transmission distance for both the light and heavy fission products. The results of both distributions form a bounding window (i.e. thickness) for the ion capture envelope. The bounding window can be extended past the light ion to allow for fission products produced from nearer the edges of the uranium fuel. Fission product transmission can be feasible for uranium oxide or uranium metal.

Figure 18:
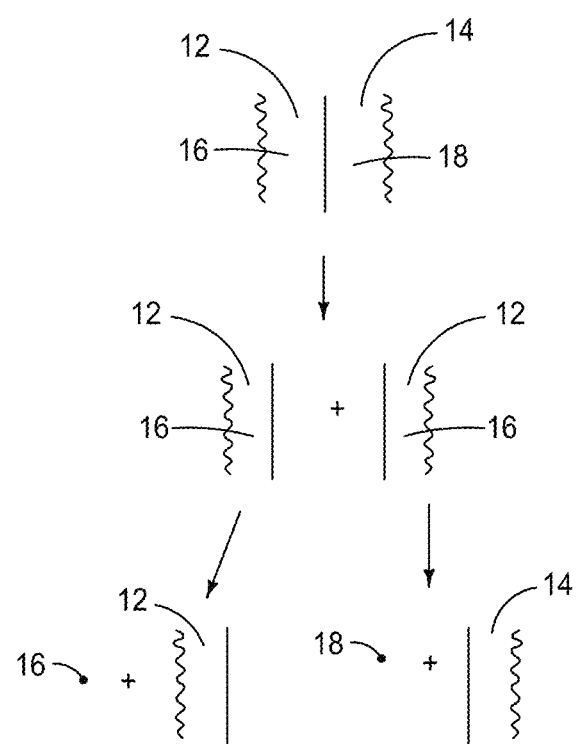
FIG. 18 is a depiction of a method for separating fissioned products from fissioned fissile target material according to an embodiment of the disclosure.

Referring next to FIG. 18, an irradiated fission material can have at least a portion of the capture layer 14 separated to provide the capture layer 14 and the fission product 18. The fission product itself can then be separated from the capture layer to provide a pure fission product that is separated from the fissile target. In accordance with example implementations, further, the fissile target can be additionally processed to separate the fissile atom from the target material itself and/or the activation product from the target material itself.

Figure 19:
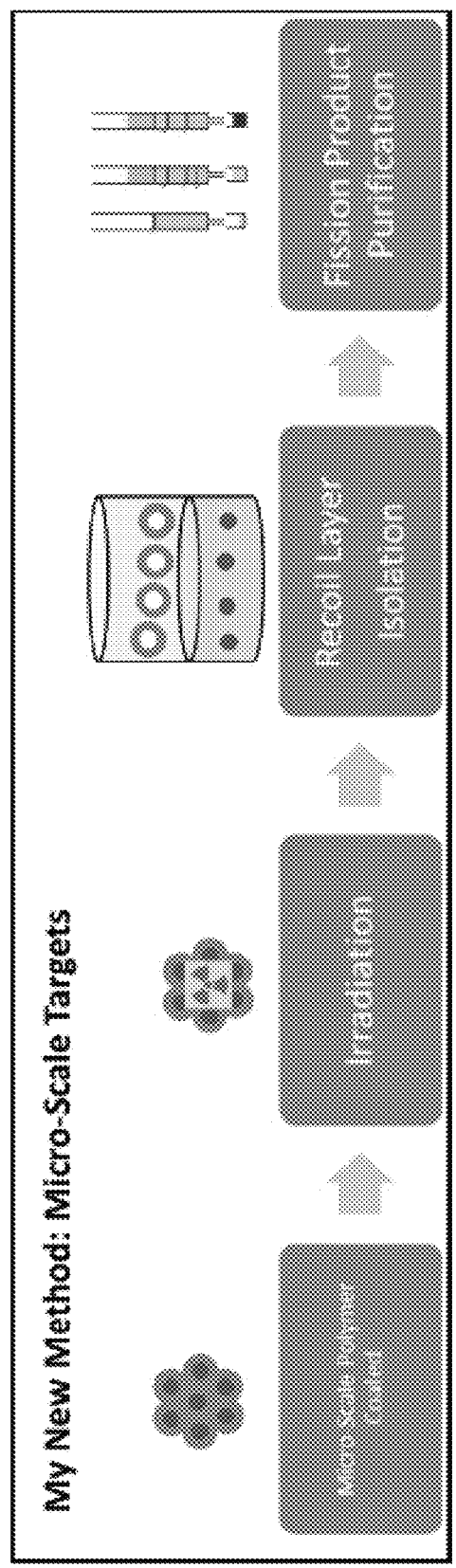
FIG. 19 is another depiction of a method for separating fissioned product from fissioned fissile target materials according to an embodiment of the disclosure.

Referring next to FIG. 19, an overall process for the processing of these novel target materials is shown with a microscale polymer-coated target material being irradiated, and then the capture layer isolated, and the capture layer isolation having the fission product purified through solid phase extraction as shown. In the depicted method, target materials are irradiated and then the outer layer is separated in a single contact step, for example. The target material can remain whole and may be recycled for additional irradiation or it can be further processed for isolation of activation products. The fission products isolated with the envelope layer may be further processed for inter-fission product separation at the small scale. Example methods allow for recoating and recycling of the targets, low-dose activation product isolation, and/or small-scale inner fission product purification. Accordingly, sustainable and affordable ways to produce isotopes is provided.

Figure 20:
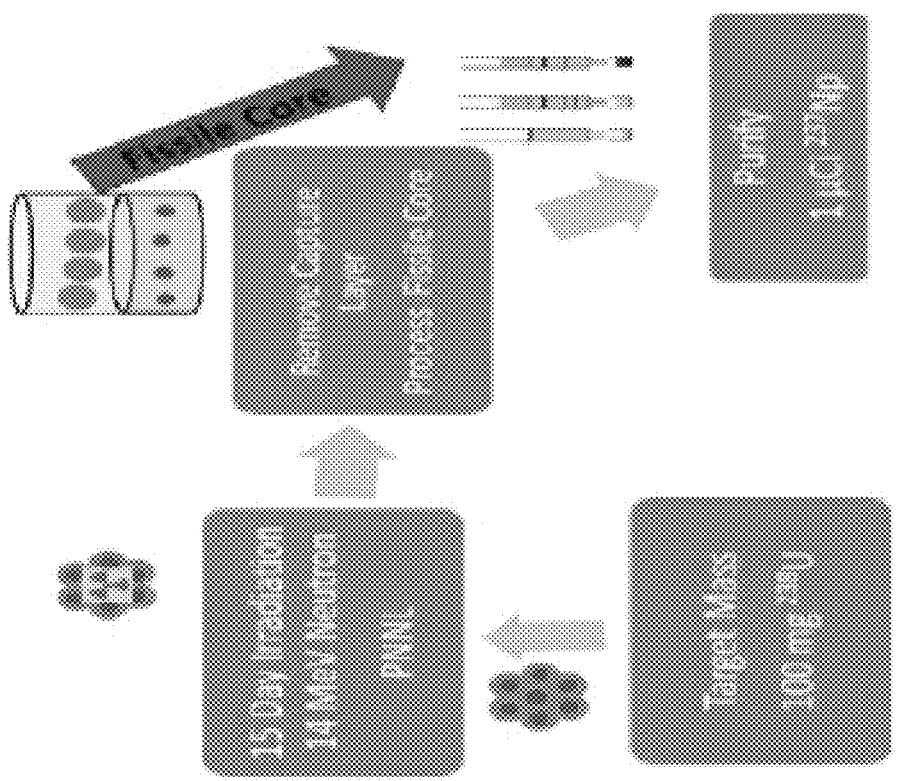
FIG. 20 is another depiction of a method for separating fissioned product from fissioned fissile target materials according to an embodiment of the disclosure.
Figure 21:
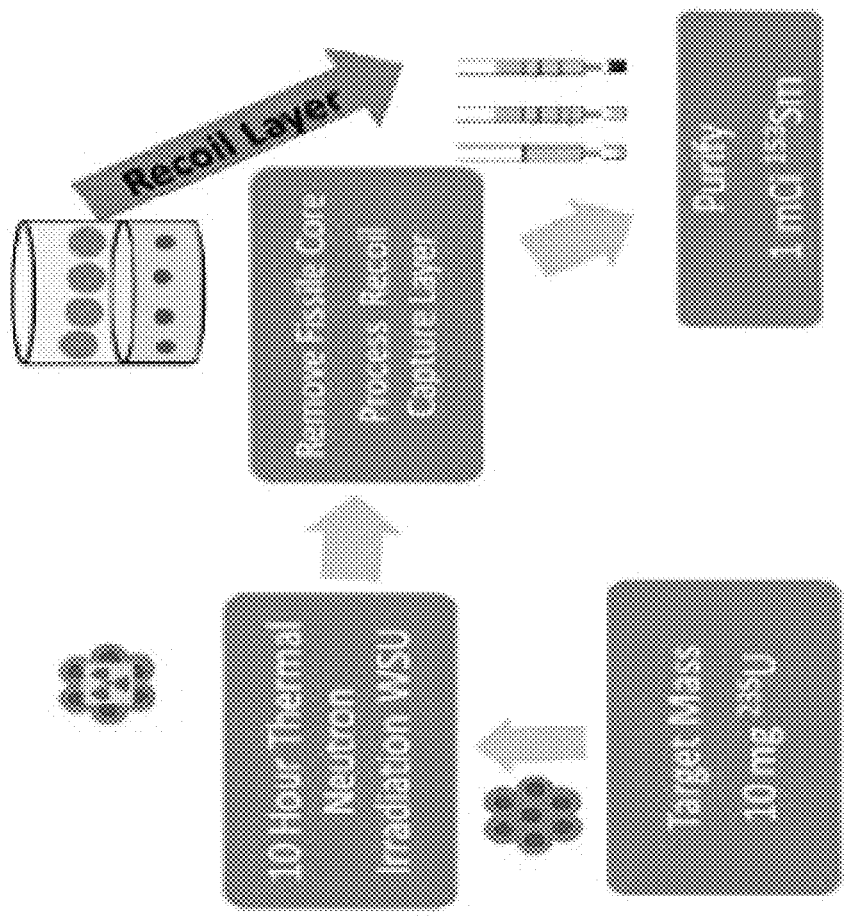
FIG. 21 is yet another depiction of a method for separating fissioned product from fissioned fissile target materials according to an embodiment of the disclosure.
Figure 22:
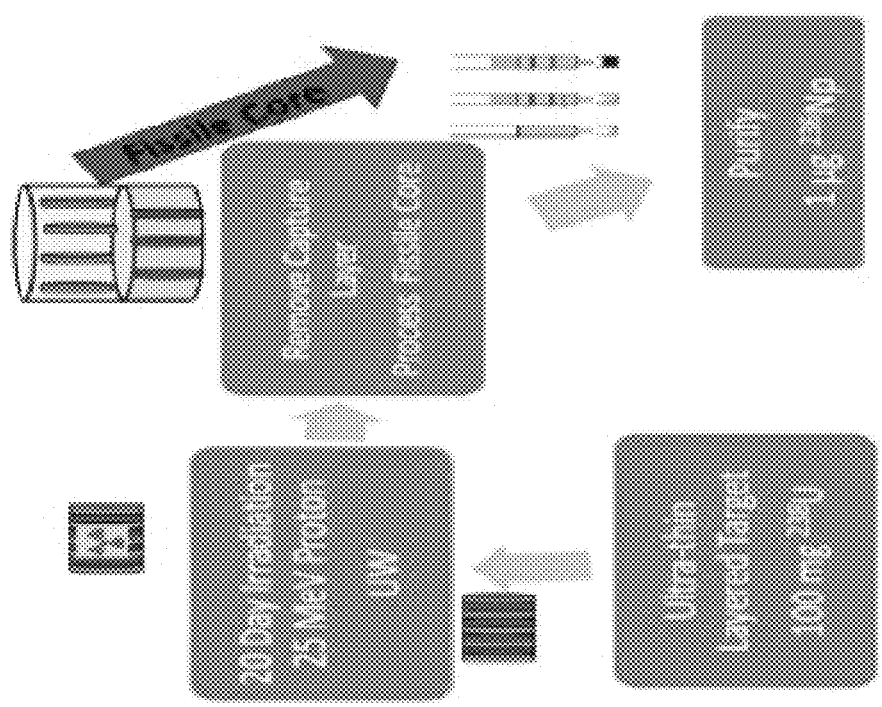
FIG. 22 is yet another depiction of a method for separating fissioned product from fissioned fissile target materials according to an embodiment of the disclosure.

In accordance with example implementations, with reference to FIGS. 20-22, examples of different target materials exposed to different irradiations, to provide different fission products are provided.

Referring next to FIG. 20, in accordance with another example method, 1 μCi of $^{237}$Np can be produced from the irradiation of $^{238}$U (n, 2n) $^{237}$U(β$^-$)$^{237}$Np. Fissile target materials can be prepared for a final $^{238}$U mass of 100 mg. In accordance with at least one implementation, in a single batch, the sample can be irradiated for 15 consecutive day. This irradiation will can produce $10^{15}$ fissions. After removal of the capture layer, the dose rate of the fissile can be substantially smaller and/or the cost of waste for $^{237}$Np purification will be less than conventional production costs.

Referring next to FIG. 21, a sum of micro-scale layered fissile cores can be prepared summing to the $^{235}$U core mass of 10 mg. This sample can be irradiated in a single batch for example. The fissioned target material can be analyzed for isolation of the $^{153}$Sm, $^{75}$Se, and/or $^{131}$I.

Referring to FIG. 22 an example production scale method for $^{236}$Np is depicted. This is at least one example of where concurrent ejection and separation of fission products from the target material is beneficial for time, dose, and cost reduction. Thin layered foils of $^{238}$U sandwiched between fissile recoil capture layers can be provided. The total $^{238}$U mass can be 100 mg.

Accordingly, the method can include production of $^{236}$Np by proton bombardment of $^{238}$U at roughly 25 MeV. During the production of $^{236}$Np, a side product of $1\times10^{18}$ fissions are produced, which approximately correlates to 500 Rad an hour after 7 days of cooling. With the fissile target materials of the present disclosure, the fission products can be ejected from the target material and captured in the capture layer. In a single step performed in a hot cell, the capture layer, containing the fission products, can be removed from the target material, containing the $^{238}$U and $^{236}$Np. A follow-on purification procedure can be performed in a glove box. The cost, time, and purity of the final $^{236}$Np product will be superior to prior art methods.

Figure 23:
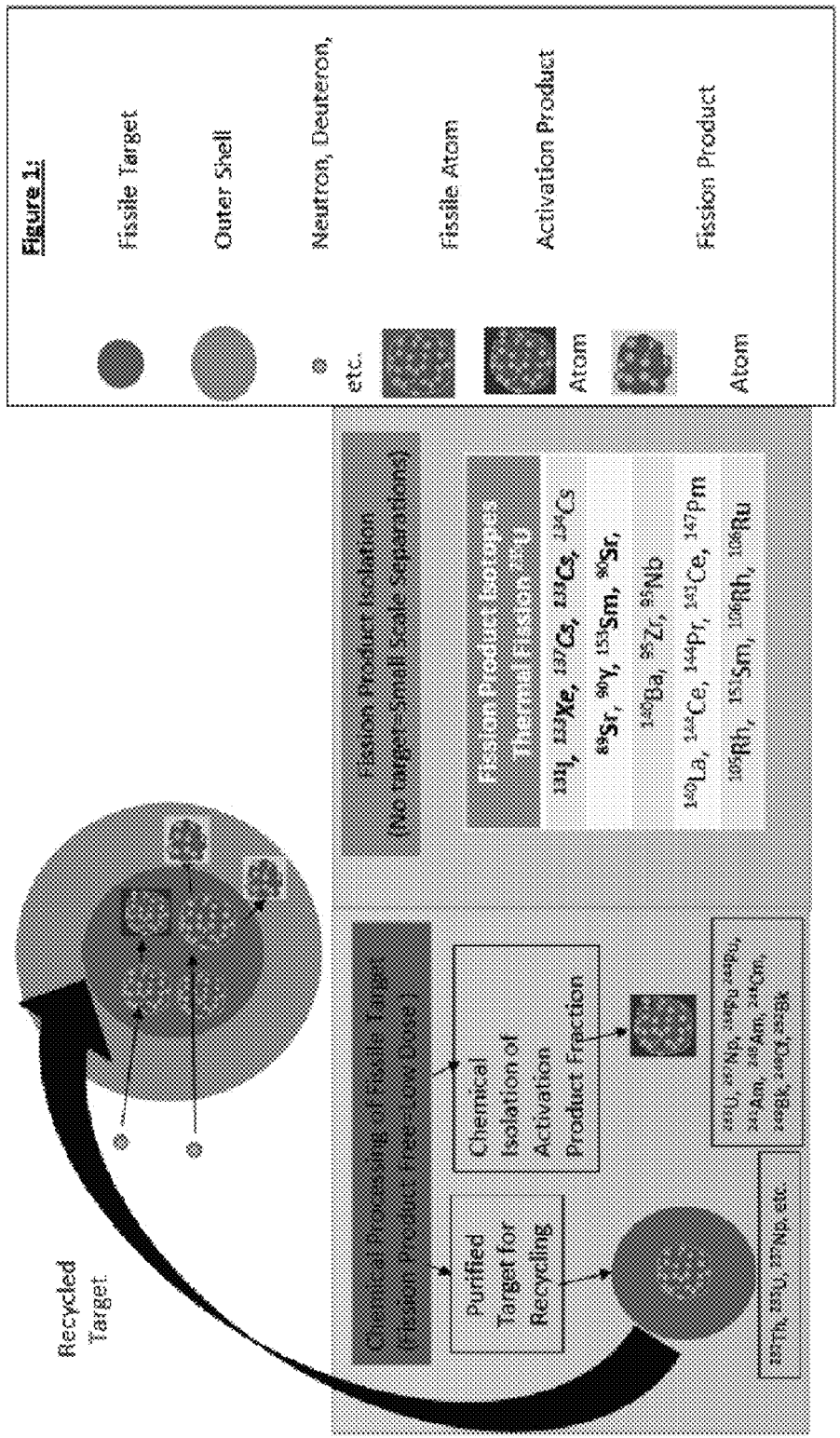
FIG. 23 is a depiction of a fissioned fissile target material and the separation of the target for recycling and the separation of the activation product according to an embodiment of the disclosure.

Referring next to FIG. 23, an overall scheme of the potential fission product target materials and/or activation products is shown in an irradiated target material, and these are the materials that are potentially utilized in these methods. The target materials of the present disclosure, separation of the polymer layer containing fission product from the target material can occurs in a single contact, with separation of the individual fission products as a purifying step. Accordingly, the methods can require fewer steps, less labor, less time, and performed at a fraction of the current cost of traditional bulk target processing methods. As shown, the methods can include processing the fissile target after removal of the capturing layer. This processing can include separating activation product from purified target. In accordance with example implementations, this purified target can have a capturing layer applied once again and irradiation repeated.

In accordance with example implementations, fuel cells can include the target materials of the present disclosure, and these fuel cells can be packed with microscale or planar materials, and the microscale or planar materials can be processed upon irradiation in conventional nuclear reactor assemblies.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A fissile target material of a nuclear reaction, the fissile target material comprising:
   a target substrate, wherein the target substrate comprises a fissile target material including uranium;
   a first capturing layer operably interfacing with a surface of the target substrate, the first capturing layer being of a first composition and configured to capture at least one of a first set of predetermined nuclear reaction fission products generated by irradiation of the fissile target material;
   a second capturing layer operably interfacing with a surface of the first capturing layer, the second capturing layer being of a second composition and configured to capture at least one of a second set of predetermined nuclear reaction fission products generated by irradiation of the fissile target material, wherein the first composition comprises a different material than the second composition and the first set of nuclear reaction fission products are different from the second set of nuclear reaction fission products; and
   wherein the interface between the target substrate and the first capturing layer is configured to allow for the first capturing layer to be removed from the target substrate after irradiation.

2. The fissile target material of claim 1 wherein the first capturing layer comprises a metal.

3. The fissile target material of claim 1 wherein the first capturing layer comprises V.

4. The fissile target material of claim 1 wherein in at least one cross section, the thickness of the fissile target material is from 12 μm to 40 μm.

5. The fissile target material of claim 1 wherein in at least one cross section, the thickness of the target substrate is from 3 μm to 5 μm.

6. The fissile target material of claim 1 wherein in at least one cross section, the thickness of either or both of the first or second capturing layers is from 9 μm to 35 μm.

7. The fissile target material of claim 6 wherein the thickness of the first capturing layer is greater than 9 μm.

8. The fissile target material of claim 1 wherein the interface between the first capturing layer and the second capturing layer is configured to allow for the second capturing layer to be removed from the first capturing layer.

* * * * *